(No Model.)
D. B. EASTBURN.
ROASTER.
No. 282,617. Patented Aug. 7, 1883.
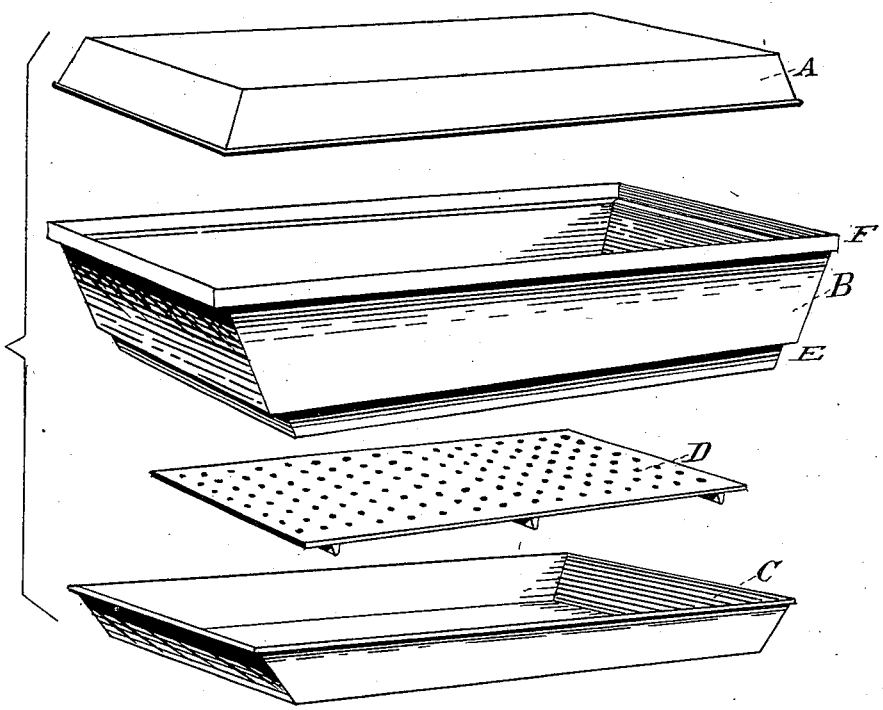

UNITED STATES PATENT OFFICE.

DAVID B. EASTBURN, OF SOUTH BEND, INDIANA.

ROASTER.

SPECIFICATION forming part of Letters Patent No. 282,617, dated August 7, 1883.

Application filed April 9, 1883. (No model.)

*To all whom it may concern:*

Be it known that I, DAVID B. EASTBURN, of the city of South Bend, and county of St. Joseph, and State of Indiana, have invented certain new and useful Improvements in Roasters; and I do hereby declare the following to be a full and clear description of the same, whereby those skilled in the art to which my invention appertains may be enabled to make and use the same, reference being had to the accompanying drawings, which form a part of this specification, in which—

Figure 1 shows the external appearance of the roaster when put together ready for use, and Fig. 2 shows the different parts of which the roaster is made.

Similar letters of reference refer to like parts in each of the figures.

A and C are common dripping-pans, A being inverted when in use. B is a bottomless section used to connect the two pans A and C, as shown in Fig. 1. D is a perforated tray, made the size of the bottom of the pan C, so that in use it will set in the pan C.

To use a roaster of my invention, place the tray D in the pan C, then place the connecting-section B upon the pan C, put a little water in the pan C, and the article to be roasted upon the tray D, invert the pan A, and place it upon the section B, causing the whole to form the external appearance shown in Fig. 1. In roasting, the water in the bottom of the pan C is converted into steam and permeates the article being roasted, making it juicy and tender, and also avoiding the necessity of any basting.

I do not claim a steam-roaster as new or novel; but one made of the two pans connected by a section is new and very desirable, as the purchaser of this kind of a roaster also has for use two dripping-pans; and this mode of making is also desirable because, being thus taken apart, it can be compactly "nested" together for storage or shipping. What I claim as new and of my invention is the roaster made in sections, as described.

I am aware that the top section, A, may be made as merely a cover instead of a pan, and I would consider that as coming within the scope of my invention, although I much prefer to have the section A a pan, as shown.

What I claim, and desire to secure by Letters Patent, is—

1. The combination of the bake-pans A C with the perforated bottom D and the bottomless connecting-section B, said section being provided with the flange E upon its lower edge, adapted to fit within the pan C, and the ledge F upon its upper edge, adapted to surround the edge of pan A.

2. In a meat-roaster, the bake-pans A and C, connected by the bottomless section B, substantially as shown.

DAVID B. EASTBURN.

Witnesses:
SCHUYLER CARSHADDON,
JOHN M. BROWN.